W. L. PAUL.
HOSE REEL.
APPLICATION FILED FEB. 23, 1910.
972,222.
Patented Oct. 11, 1910.
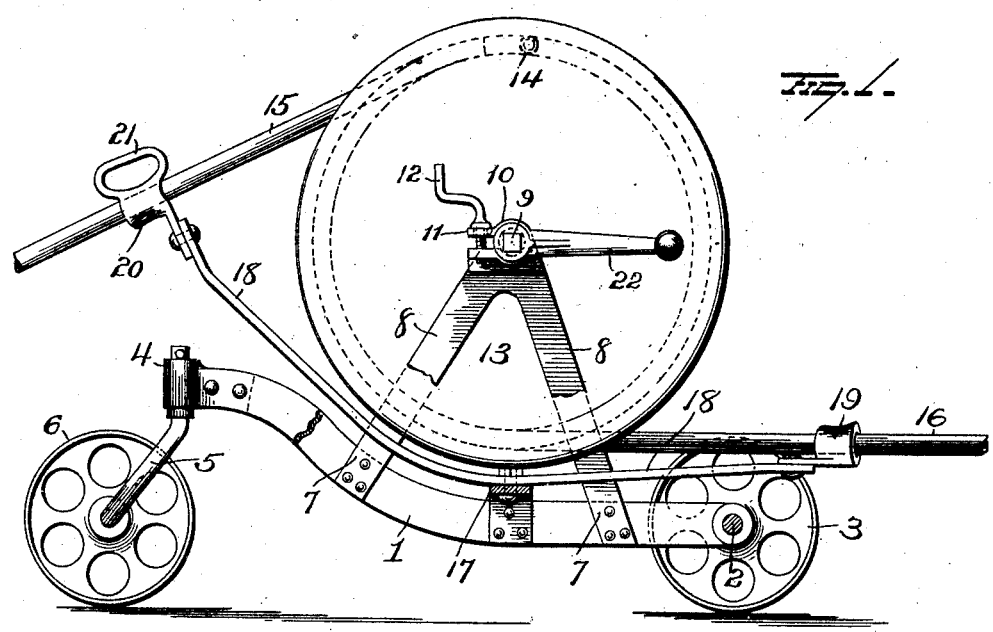
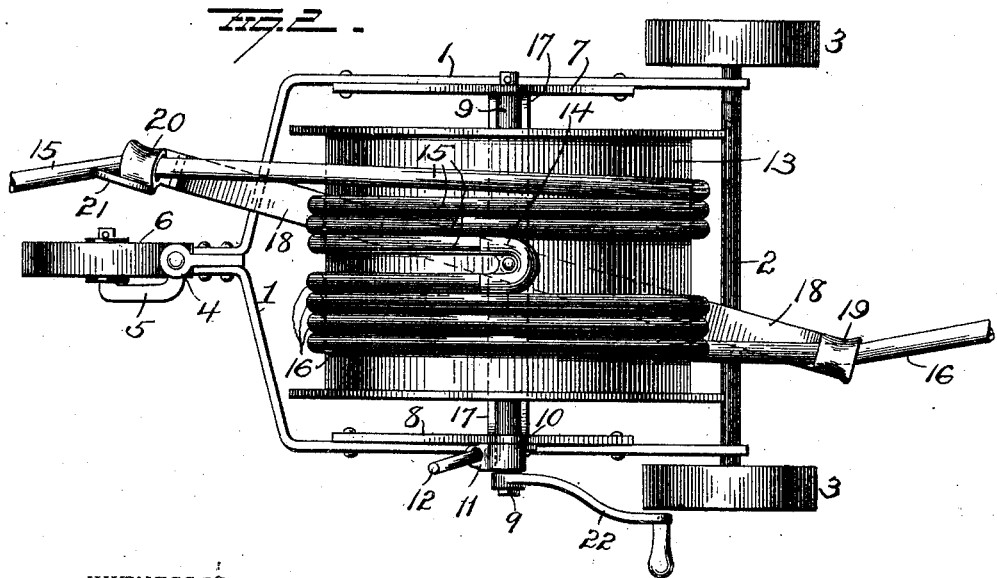
WITNESSES
INVENTOR
W. L. Paul
By H. A. Seymour
Attorney

UNITED STATES PATENT OFFICE.

WILLIAM L. PAUL, OF SOUTH BEND, INDIANA, ASSIGNOR OF ONE-HALF TO HENRY T. CURTWRIGHT, OF ST. LOUIS, MISSOURI.

HOSE-REEL.

972,222.  Specification of Letters Patent.  Patented Oct. 11, 1910.

Application filed February 23, 1910. Serial No. 545,414.

*To all whom it may concern:*

Be it known that I, WILLIAM L. PAUL, of South Bend, in the county of St. Joseph and State of Indiana, have invented certain new and useful Improvements in Hose-Reels; and I do hereby declare the following to be a full, clear, and exact description of the invention, such as will enable others skilled in the art to which it appertains to make and use the same.

This invention relates to improvements in hose reels,—the object of the invention being to provide a structure of the character described that will admit of speedy operation in reeling and unreeling the hose.

A further object is to so construct a device that it will be readily movable and permit the use of the hose without necessity for entirely removing the latter from the drum.

With these objects in view the invention consists in certain novel features of construction and combinations of parts as hereinafter set forth and pointed out in the claims.

In the accompanying drawings, Figure 1 is a side elevation partly in section, and Fig. 2 is a plan view of the device.

1 represents a truck frame provided at its rear end with an axle 2 having its ends mounted in wheels 3. The forward end of the truck frame projects upwardly somewhat and at the center of the forward end of this truck frame, a bracket 4 is secured and provides a vertical bearing for the upper end of a swiveled arm 5 carrying a caster wheel 6. Standards 7—8 rise from the respective side members of the truck frame and at their upper ends are provided with bearings for the accommodation of a horizontal shaft 9. A cap 10 is located at the upper end of the standard 8 and is disposed over the journal of the shaft 10 which is mounted on this standard. The cap 10 is made with an arm 11 through which the threaded end of a crank 12 freely passes,—the said threaded portion of the crank entering a threaded socket at the upper end of the standard 8 so that when the crank 12 is turned the cap 10 will be caused to clamp the shaft 9 and prevent it from rotation for a purpose which will be hereinafter explained.

A drum 13 is secured to the shaft 9 and on this drum, centrally between its ends, a U-shaped coupling 14 is secured. The inner ends of two sections 15—16 of hose are attached to the respective ends of the U-shaped coupling 14 and these hose sections are wound upon the drum at respective sides of said coupling so that the winding of one hose section will be reverse to the winding of the other hose section and the free ends of the respective hose sections will project beyond respective ends of the truck. One of these hose sections will be provided at its free end with a suitable coupling to permit its attachment to a water supply pipe and the free end of the other hose section will be provided with a suitable nozzle.

Assuming the hose sections to be wound upon the drum as above explained, the user can attach one of said sections to a water supply pipe and then pull the nozzle end of the other hose section to the place where he desires to sprinkle the water. During this operation both hose sections will unwind from the drum and the truck will move to the extent permitted by the unwinding of the hose. The hose may be used without completely unwinding the same from the drum and when so used the drum may be prevented from turning by clamping the shaft 9 with the cap 10 and crank 12, as before explained.

The truck frame is provided intermediate of its ends with a transverse bar 17 and to this bar a guide lever 18 is pivotally attached at a point intermediate of its ends. The guide lever 18 is provided at its ends with guide-loops 19—20 for the passage of the respective hose sections. The guide-lever 20 is provided with a handle 21 for the purpose of manipulating the guide-lever and its loops to accurately wind the hose sections on the drum. For the purpose of thus winding the hose sections on the drum, one end of the shaft 9 is provided with a crank handle 22.

Having fully described my invention what I claim as new and desire to secure by Letters-Patent, is,—

1. A device of the character described comprising a traveling drum, hose wound in opposite directions upon said drum from between the ends thereof, and means connecting an intermediate portion of the hose with the drum.

2. A device of the character described comprising a traveling drum, hose comprising two sections wound in reverse directions upon said drum, and means connecting the inner ends of the respective hose sections with each other and with the drum.

3. A device of the character described comprising a traveling drum, two hose sections wound thereon in reverse directions, and coupling means secured to the drum and connecting the inner ends of the respective hose sections.

4. A device of the character described comprising a traveling drum, a U coupling secured thereto, and two hose sections wound in reverse directions on said drum and having their inner ends attached to said U coupling.

5. The combination with a truck, of a drum revolubly mounted thereon, a guide-bar pivotally supported by the truck, and guide-loops at respective ends of said guide-bar for the passage of hose.

6. The combination with a truck, of a drum revolubly mounted thereon, a guide-bar pivotally supported upon the truck and projecting at its ends beyond the drum, guide-loops on said guide-bar, and means for manipulating the guide-bar and its loops.

In testimony whereof, I have signed this specification in the presence of two subscribing witnesses.

WILLIAM L. PAUL.

Witnesses:
DANIEL D. SCHURTZ,
FRANK A. BOULTON.